US012652118B2

(12) United States Patent
Zink et al.

(10) Patent No.: US 12,652,118 B2
(45) Date of Patent: *Jun. 9, 2026

(54) METHOD FOR IDENTIFYING NEW AUDIENCES FOR CONTENT OF A CONTENT PROVIDER

(71) Applicant: Google LLC, Mountain View, CA (US)

(72) Inventors: Daniel Zink, Redmond, WA (US); Jane Huang, Bellevue, WA (US); Hao Chen, Redmond, WA (US); Ian Porteous, Mercer Island, WA (US); Surbhi Maheshwari, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,528

(22) Filed: Jul. 8, 2024

(65) Prior Publication Data

US 2024/0364441 A1    Oct. 31, 2024

Related U.S. Application Data

(63) Continuation of application No. 17/377,215, filed on Jul. 15, 2021, now Pat. No. 12,034,525.

(51) Int. Cl.
| | |
|---|---|
| *H04H 60/66* | (2008.01) |
| *G06Q 30/0202* | (2023.01) |
| *G06Q 30/0251* | (2023.01) |

(52) U.S. Cl.
CPC ......... *H04H 60/66* (2013.01); *G06Q 30/0202* (2013.01); *G06Q 30/0251* (2013.01)

(58) Field of Classification Search
CPC ........... G06Q 30/0202; G06Q 30/0251; G06Q 10/101; G06Q 30/0244; G06Q 30/0269;

(Continued)

(56) References Cited

U.S. PATENT DOCUMENTS

| | | | |
|---|---|---|---|
| 11,127,032 B2 | 9/2021 | Thimmaiah et al. | |
| 2011/0106611 A1* | 5/2011 | Chang ................ | G06Q 30/0243 715/764 |

(Continued)

FOREIGN PATENT DOCUMENTS

| | | |
|---|---|---|
| JP | 2015525496 A | 9/2015 |
| KR | 20150035754 A | 4/2015 |

(Continued)

OTHER PUBLICATIONS

Gharibshah Z., et al., "User Response Prediction in Online Advertising," ACM Computing Surveys, Cornell University Library, Jan. 7, 2021, Article 111, vol. 37, No. 4, 48 Pages, Retrieved from URL: irxiv.org.

(Continued)

*Primary Examiner* — Rami R Okasha
(74) *Attorney, Agent, or Firm* — Lowenstein Sandler LLP

(57) ABSTRACT

A method is disclosed for providing, for display to a content provider, a user interface (UI) indicating one or more characteristics of existing audiences including a plurality of users currently designated to receive content of the content provider, the UI comprising a new audiences UI element selectable to view new audiences to be added to the existing audiences, receiving a user selection of the new audiences UI element, and in response to the user selection of the new audiences UI element, predicting, using a machine learning model, an increase in a number of user actions related to the content of the content provider in response to an addition of the new audiences to the existing audiences, and causing display of information identifying the new audiences, and an indication of the predicted increased number of user actions related to the content of the content provider in response to the addition of the new audiences to the existing audiences.

19 Claims, 9 Drawing Sheets

(58) Field of Classification Search
CPC ........ G06Q 50/01; G06Q 50/10; H04H 60/66; H04H 60/33; H04N 21/4668; H04N 21/812; H04N 21/4788
See application file for complete search history.

(56) References Cited

U.S. PATENT DOCUMENTS

| | | | |
|---|---|---|---|
| 2013/0151332 A1 | 6/2013 | Yan et al. | |
| 2014/0046754 A1 | 2/2014 | Lee et al. | |
| 2015/0006286 A1* | 1/2015 | Liu | G06Q 50/01 |
| | | | 705/14.53 |
| 2015/0332310 A1* | 11/2015 | Cui | G06Q 30/0275 |
| | | | 705/14.45 |
| 2015/0339702 A1 | 11/2015 | Lin et al. | |
| 2016/0027048 A1 | 1/2016 | Ma et al. | |
| 2016/0140609 A1* | 5/2016 | Demir | G06Q 30/0201 |
| | | | 705/7.29 |
| 2016/0232575 A1 | 8/2016 | Kirti et al. | |
| 2016/0343026 A1 | 11/2016 | Cheng et al. | |
| 2017/0011430 A1 | 1/2017 | Sparrow et al. | |
| 2017/0178197 A1 | 6/2017 | Hong et al. | |
| 2017/0186031 A1* | 6/2017 | Kirti | G06Q 30/0277 |
| 2019/0311418 A1* | 10/2019 | Pandit | G06Q 50/01 |
| 2020/0160373 A1 | 5/2020 | Thimmaiah et al. | |
| 2020/0160375 A1 | 5/2020 | Berrett et al. | |
| 2020/0233911 A1 | 7/2020 | Siroker et al. | |
| 2020/0314472 A1 | 10/2020 | Rao et al. | |
| 2021/0342866 A1 | 11/2021 | Girabawe et al. | |

FOREIGN PATENT DOCUMENTS

| | | |
|---|---|---|
| KR | 101913307 B1 | 10/2018 |
| KR | 20210010119 A | 1/2021 |
| WO | 2016011659 A1 | 1/2016 |

OTHER PUBLICATIONS

International Search Report and Written Opinion for International Application No. PCT/US2021/062472, mailed Mar. 28, 2022, 23 Pages.

Office Action for Japanese Patent Application No. 2024501885, mailed Apr. 1, 2025, 02 Pages.

Office Action of Korean Patent Application No. 20247004029, mailed May 16, 2025, 12 Pages.

\* cited by examiner

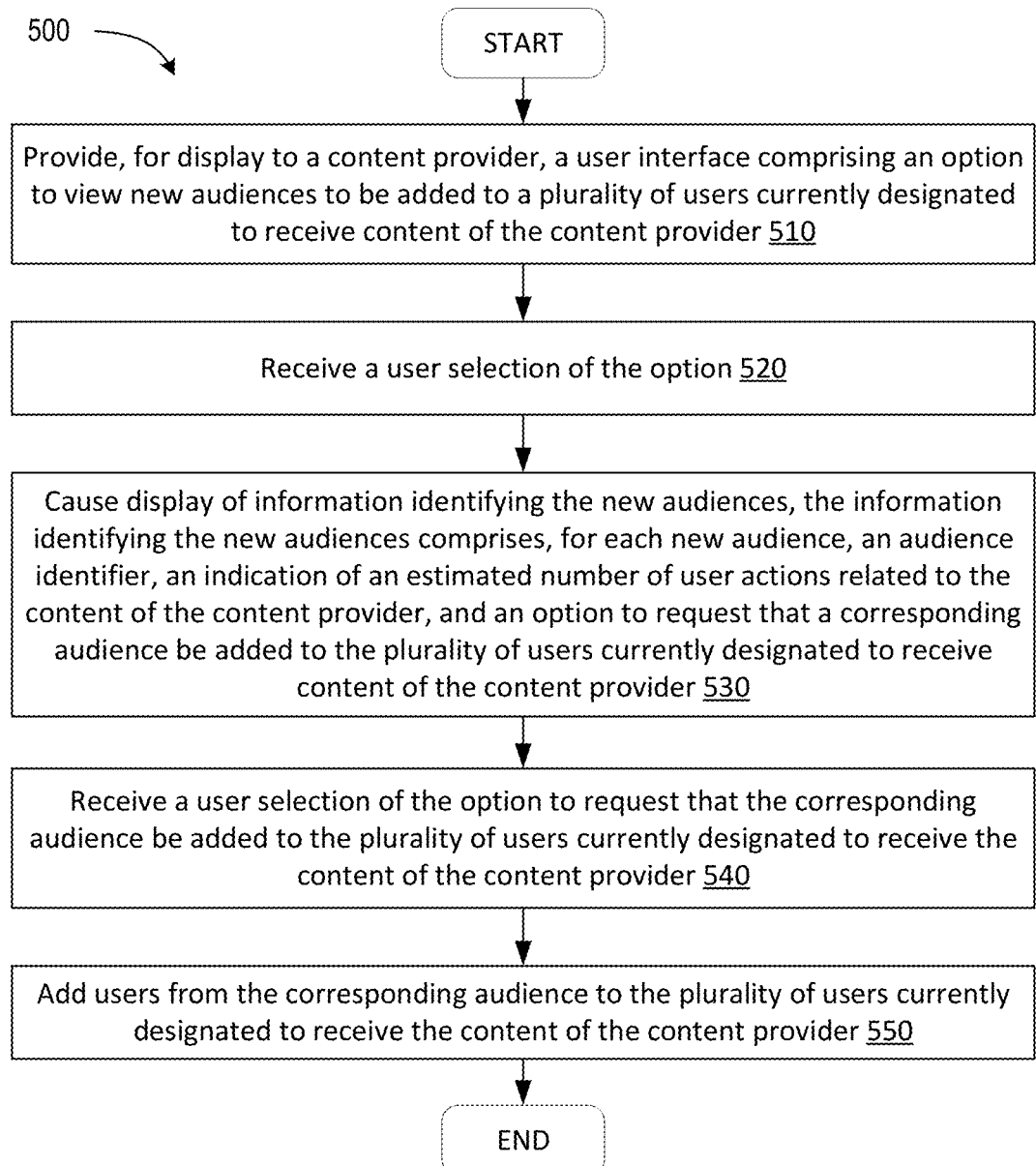

500

START

Provide, for display to a content provider, a user interface comprising an option to view new audiences to be added to a plurality of users currently designated to receive content of the content provider 510

Receive a user selection of the option 520

Cause display of information identifying the new audiences, the information identifying the new audiences comprises, for each new audience, an audience identifier, an indication of an estimated number of user actions related to the content of the content provider, and an option to request that a corresponding audience be added to the plurality of users currently designated to receive content of the content provider 530

Receive a user selection of the option to request that the corresponding audience be added to the plurality of users currently designated to receive the content of the content provider 540

Add users from the corresponding audience to the plurality of users currently designated to receive the content of the content provider 550

END

FIG. 5

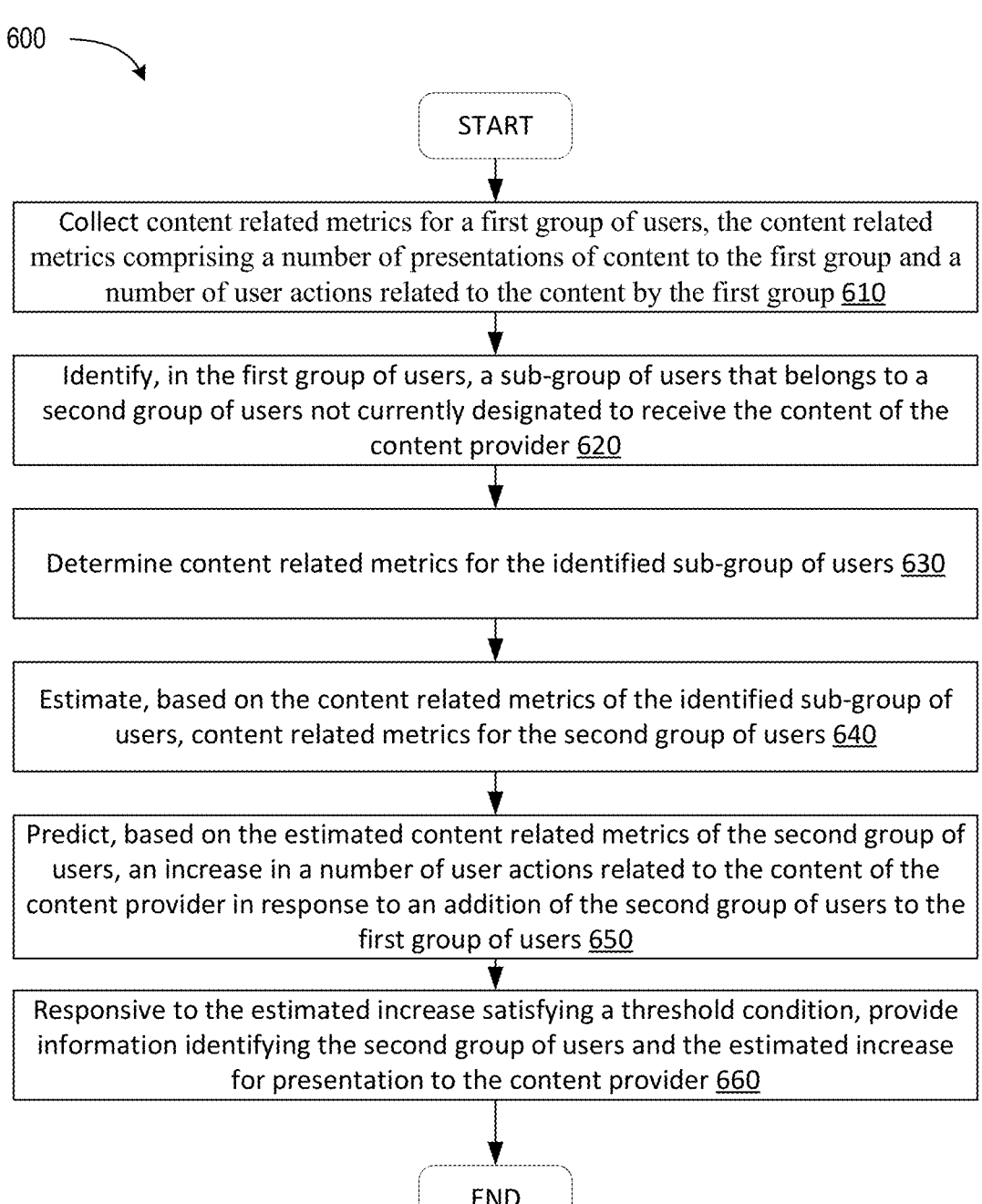

600

START

Collect content related metrics for a first group of users, the content related metrics comprising a number of presentations of content to the first group and a number of user actions related to the content by the first group 610

Identify, in the first group of users, a sub-group of users that belongs to a second group of users not currently designated to receive the content of the content provider 620

Determine content related metrics for the identified sub-group of users 630

Estimate, based on the content related metrics of the identified sub-group of users, content related metrics for the second group of users 640

Predict, based on the estimated content related metrics of the second group of users, an increase in a number of user actions related to the content of the content provider in response to an addition of the second group of users to the first group of users 650

Responsive to the estimated increase satisfying a threshold condition, provide information identifying the second group of users and the estimated increase for presentation to the content provider 660

END

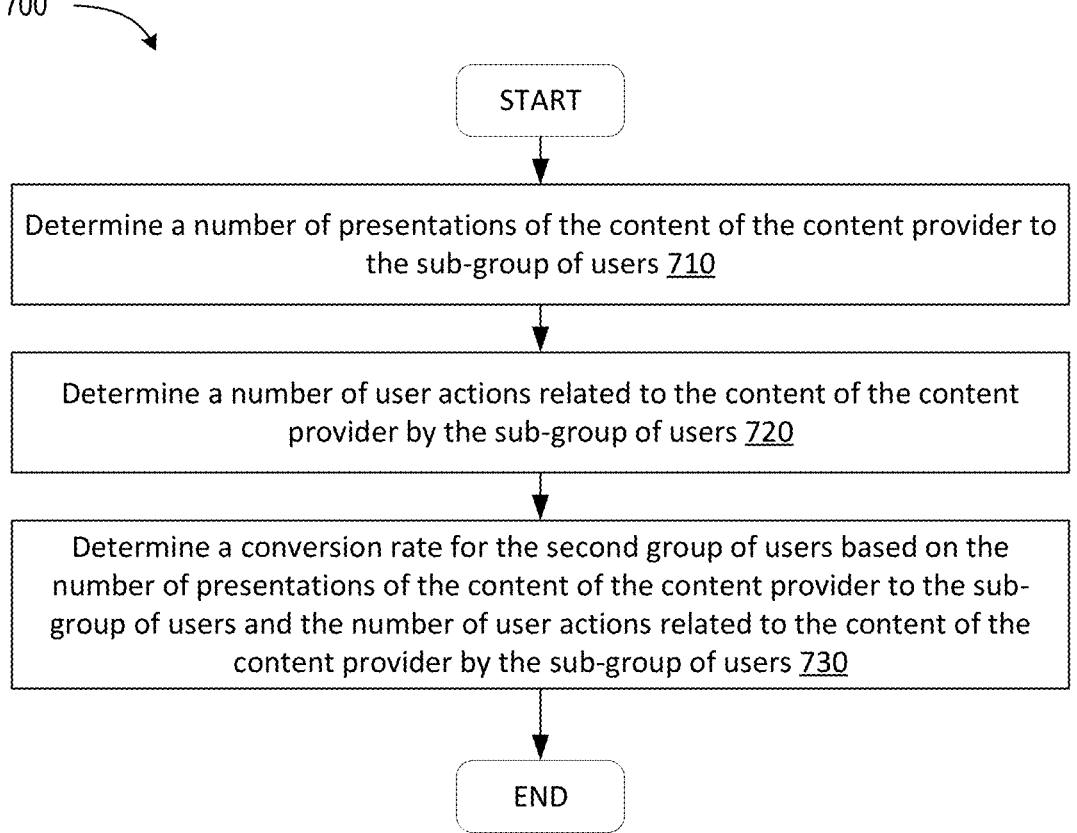

START

Determine a number of presentations of the content of the content provider to the sub-group of users 710

Determine a number of user actions related to the content of the content provider by the sub-group of users 720

Determine a conversion rate for the second group of users based on the number of presentations of the content of the content provider to the sub-group of users and the number of user actions related to the content of the content provider by the sub-group of users 730

END

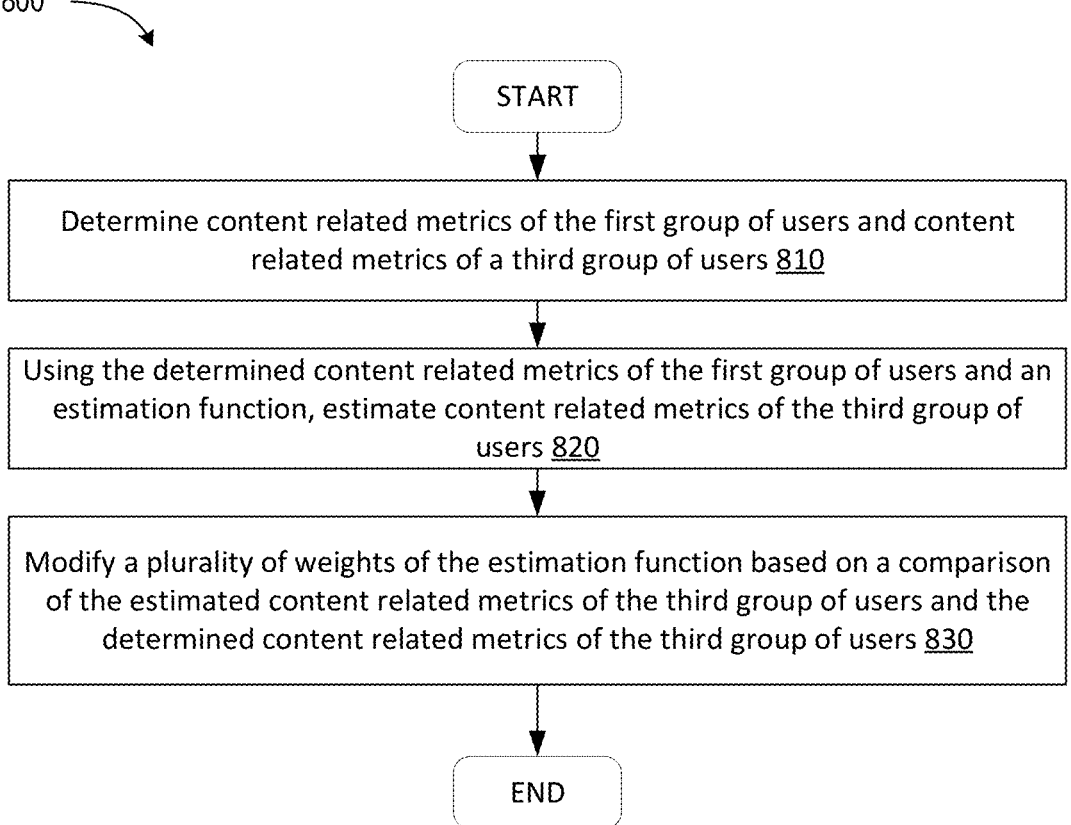

START

Determine content related metrics of the first group of users and content related metrics of a third group of users 810

Using the determined content related metrics of the first group of users and an estimation function, estimate content related metrics of the third group of users 820

Modify a plurality of weights of the estimation function based on a comparison of the estimated content related metrics of the third group of users and the determined content related metrics of the third group of users 830

END

FIG. 8

METHOD FOR IDENTIFYING NEW AUDIENCES FOR CONTENT OF A CONTENT PROVIDER

RELATED APPLICATIONS

This application is a continuation application of co-pending U.S. patent application Ser. No. 17/377,215, filed Jul. 15, 2021, which is incorporated herein by reference

TECHNICAL FIELD

Aspects and implementations of the present disclosure relate to identifying new audiences for content of a content provider.

BACKGROUND

A provider of content frequently selects an appropriate group of users that may be interested in the content. The content provider may want to change the size of the group of users to include additional users or limit the users that may be presented with the content. The content provider may not easily identify users to include or exclude from the group of users that may be interested in the content.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method comprising: providing, for display to a content provider, a user interface comprising an option to view new audiences to be added to a plurality of users currently designated to receive content of the content provider; receiving a user selection of the option; and causing display of information identifying the new audiences, the information identifying the new audiences comprises, for each new audience, an audience identifier, an indication of an estimated number of user actions related to the content of the content provider, and an option to request that a corresponding audience be added to the plurality of users currently designated to receive the content of the content provider.

In some implementations, the method further comprises: receiving a selection of the option to request that the corresponding audience be added to the plurality of users currently designated to receive the content of the content provider; and adding users from the corresponding audience to the plurality of users currently designated to receive the content of the content provider.

In some implementations, the content of the content provider comprises one or more secondary media items to be presented to the plurality of users in association with a primary media item on a user interface of a content sharing platform.

In some implementations, the indication of the estimated number of user actions related to the content of the content provider comprises an estimated increase in a number of user actions related to the content of the content provider in response to addition of the users from the corresponding audience to the plurality of users currently designated to receive the content of the content provider.

In some implementations, providing, for display to the content provider, the user interface comprising an option to view new audiences to be added to the plurality of users currently designated to receive the content of the content provider further comprises: collecting data identifying a number of presentations of the content of the content provider to a first group of users and a number of user actions related to the content of the content provider by the first group of users; identifying, in the first group of users, a sub-group of users that belongs to a second group of users not currently designated to receive the content of the content provider; determining content related metrics for the identified sub-group of users, the content related metrics for the identified sub-group of users comprising a number of presentations of the content of the content provider to the identified sub-group of users and a number of user actions related to the content of the content provider by the identified sub-group of users; estimating, based on the content related metrics for the identified sub-group of users, content related metrics for the second group of users, the estimated content related metrics for the second group of users comprising an estimated number of presentations of the content of the content provider to the second group of users and an estimated number of user actions related to the content of the content provider by the second group of users; predicting, based on the estimated content related metrics for the second group of users, an increase in a number of user actions related to the content of the content provider in response to an addition of the second group of users to the first group of users; and responsive to the predicted increase satisfying a threshold condition, adding the second group of users to the new audiences, wherein the displayed information identifying the new audiences comprises an identifier of the second group of users and the predicted increase in the number of user actions related to the content of the content provider.

Another aspect of the disclosure provides a computer-implemented method comprising: collecting content related metrics for a first group of users, the content related metrics for the first group of users comprising a number of presentations of content of a content provider to the first group of users and a number of user actions related to the content provider by the first group of users; identifying, in the first group of users, a sub-group of users that belongs to a second group of users not currently designated to receive the content of the content provider; determining, based on the content related metrics for the first group of users, content related metrics for the identified sub-group of users; estimating, based on the content related metrics of the identified sub-group of users, content related metrics for the second group of users; predicting, based on the estimated content related metrics of the second group of users, an increase in a number of user actions related to the content of the content provider in response to an addition of the second group of users to the first group of users; and responsive to the estimated increase satisfying a threshold condition, providing information identifying the second group of users and the estimated increase for presentation to the content provider.

In some implementations, estimating the content related metrics for the second group of users further comprises: determining a number of presentations of the content of the content provider to the sub-group of users; determining a number of user actions related to the content of the content provider by the sub-group of users; and determining a conversion rate for the second group of users based on the number of presentations of the content of the content provider to the sub-group of users and the number of user actions related to the content of the content provider by the sub-group of users.

In some implementations, determining the conversion rate for the second group of users further comprises: comparing a set of characteristics associated with the sub-group of users with a set of characteristics associated with the second group of users, wherein the conversion rate for the second group of users is determined based on a comparison of the set of characteristics associated with the sub-group of users with the set of characteristics associated with the second group of users.

In some implementations, the increase in the number of user actions related to the content of the content provider is predicted using an estimation function.

In some implementations, the estimation function comprises one or more formulas that use a plurality of parameters and a plurality of corresponding weights, wherein the plurality of parameters comprises a number of users in the second group that are not currently designated to receive the content of the content provider, an estimated number of presentations of the content of the content provider to the second group of users, and an estimated number of user actions related to the content of the content provider by the second group of users.

In some implementations, the method further comprises: determining content related metrics of the first group of users and content related metrics of a third group of users, wherein the first group of users and the third group of users were previously designated to receive the content of the content provider in the past; using the determined content related metrics of the first group of users and the estimation function, obtaining estimated content related metrics of the third group of users; and modifying the plurality of weights of the estimation function based on a comparison of the estimated content related metrics of the third group of users and the determined content related metrics of the third group of users.

A further aspect of the disclosure provides a system comprising: a memory; and a processing device, coupled to the memory, the processing device to perform a method according to any aspect or embodiment described herein.

A further aspect of the disclosure provides a non-transitory computer-readable medium comprising instructions that, responsive to execution by a processing device, cause the processing device to perform operations according to any aspect or embodiment described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 5 illustrates a flow diagram for an example method for providing a user interface to a content provider, the user interface containing new audience recommendations, in accordance with some aspects of the present disclosure.

FIG. 6 illustrates a flow diagram for an example method for determining new audiences to recommend to a content provider, in accordance with some aspects of the present disclosure.

FIG. 7 illustrates a flow diagram for an example method for estimating a conversion rate for a group of users not currently designated to receive content of a content provider, in accordance with some aspects of the present disclosure.

FIG. 8 illustrates a flow diagram for an example method for optimizing the estimation function used to predict an increased number of user actions related to content of the content provider, in accordance with some aspects of the present disclosure.

DETAILED DESCRIPTION

Figure 1:
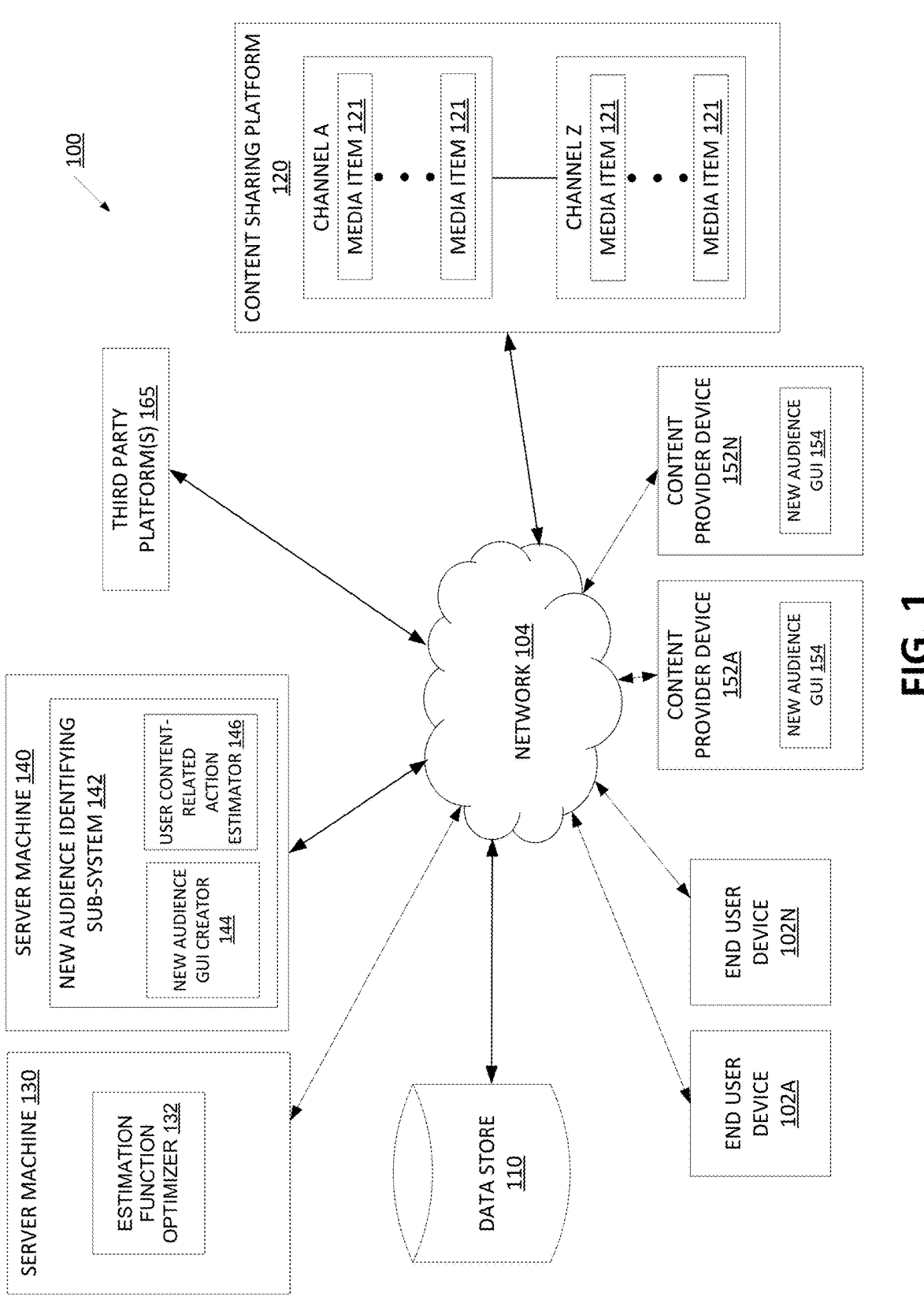
FIG. 1 illustrates an example system architecture, in accordance with implementations of the present disclosure.

Aspects of the present disclosure are directed at identifying new audiences for content of a content provider. A content provider typically selects certain audiences that are likely to be interested in content of the content provider. Each audience may contain a group of end users of a content sharing platform with one or more shared interests. The end users in the selected audiences may then be presented with the content provider's content based on a probability p. The content provider's selection may be considered successful if a significant number of end users perform one or more specific actions while presented with the content of the content provider (e.g., selecting the content, registering for a class identified in/promoted by the content, downloading a mobile application identified in/promoted by the content, subscribing to a channel of the content provider, etc.). After making an initial selection and after seeing its initial success, the content provider may decide to focus on a different set of audiences to increase the number of end users that are likely to be interested in the content of the content provider. Selecting an appropriate group of audiences that may be interested in the content of the content provider can be overwhelming for the content provider.

Existing mechanisms that generate recommendations to content providers of new audiences to target do not include an indication of the increased number of content related user actions that are estimated to occur if a certain new audience is added to the group of audiences that are being targeted. Rather, existing mechanisms simply show how many end users of a certain new audience have already performed specific content related actions. If a content provider decides which new audiences to target based only on the number of end users in that audience that have already performed content related actions, the selection of that audience may result in the presentation of the content to a significant number of users that are not interested in the content, resulting in inefficient use of processing resources and lack of the users' trust in the content sharing platform.

Implementations of the present disclosure address the above and other deficiencies by identifying new audiences for content of a content provider using a function that estimates the likely number of additional content related user actions that would result if the new audience is added to the existing audiences designated to receive the content of the content provider. The estimation function uses data gathered from the presentation of content to the existing audiences as well as information about the potential new audiences to generate the estimated number of increased content related user actions. A subset of the best new audiences is then presented to the content provider. In order to generate the best estimates, data from past content presentations to the existing audiences can be used offline to evaluate and improve the accuracy of the estimation function.

In some implementations, a user interface with an option to view new audiences to be added to the users currently designated to receive content of the content provider is provided for display to the content provider. Upon receiving a user selection of the option to view new audiences to be added, information identifying the new audiences is displayed. The information identifying the new audiences may include, for each new audience, an audience identifier, an indication of an estimated number of user actions related to the content of the content provider, and an option to request that a corresponding new audience be added to the users currently designated to receive the content of the content provider. The indication of the estimated number of user actions related to the content may be in the form of an estimated increase in the number of user actions related to the content if the users from the corresponding new audience are added to the users currently designated to receive the content. The option to request that the corresponding new audience be added to the existing audiences may be in the form of a selectable user interface (UI) element (e.g., a button, a link, etc.) presented in association with the identifier of the corresponding new audience.

Upon reviewing estimated increases for the new audiences, the content provider may decide to add one or more of the new audiences to the existing audiences by selecting a UI element for each new audience to be added. In response, each selected new audience is added to the existing audiences designated to receive the content of the content provider by associating, in a data store, an identifier of each selected new audience with an identifier of the content of the content provider. For example, if the content is part of an ad campaign of the content provider, the data store may include information defining the ad campaign such as an identifier of the ad campaign, an identifier of the associated content (e.g., a video advertisement, an audio advertisement, etc.), identifiers of one or more targeted audiences, one or more parameters for presentation of the content to the targeted audiences (e.g., timing of presenting an advertisement with respect to a primary media item, skipability settings, etc.), one or more content related actions (user actions performed when presented with the content) that result in conversions, etc. When a content provider selects a new audience as discussed above, the information defining the ad campaign in the data store is updated to include the identifier of the selected new audience. This information may then be used by the content sharing platform to present the content of the content provider to the users from the selected new audience (e.g., as secondary content in association with a primary media item).

In some implementations, a new audience may be identified based on content related metrics collected for an existing audience that was previously designated to receive the content of the content provider. These content related metrics may pertain to presentations of the content of the content provider to users of the existing audience (a first group of users with shared interests) and user actions related to the content of the content provider by the first group of users. The first group of users may include some users (a sub-group of users) that also have shared interests with another group of users (a second group of users) that is not currently designated to receive the content of the content provider. For example, the first group of users may include users in market for a car, the second group of users may include homeowners, and the sub-group of users may include users who are both homeowners and in market for a car. The second group of users is not currently designated to receive the content of the content provider.

The content related metrics collected for the first group of users can be used to determine content related metrics for the sub-group of users that belong to both the first and second groups of users. The content related metrics determined for the sub-group of users can include, for example, a number of presentations of the content of the content provider to the users of the sub-group and a number of actions related to the content of the content provider by the users of the sub-group. The content related metrics determined for the sub-group of users can be further used to estimate content related metrics for the second group of users that has not been previously designated to receive the content of the content provider. Then, using the estimated content related metrics of the second group of users, an increase in a number of content related user actions that would result from the addition of the second group of users to the first group of users is predicted using an estimation function. If the estimated increase exceeds a certain threshold, information identifying the second group of users and the estimated increase is provided for presentation to the content provider.

In some implementations, the estimation function includes one or more formulas that use several parameters and corresponding weights. The parameters may include a number of users in the second group that are not currently designated to receive the content of the content provider, the number of presentations of the content to the users in the second group, and the number of actions related to the content of the content provider by the users in the second group.

In some implementations, the estimation function can be optimized using an offline process that utilizes content related metrics collected for existing audiences such as audience A and audience B that were previously designated to receive the content of the content provider and have received this content in the past. Audience A may be selected as the base audience and its content related metrics can be applied to the estimation function to predict content related metrics for audience B. The predicted content related metrics of audience B are then compared with the collected content related metrics of audience B to assess how accurate the estimation function is able to predict content related metrics of an audience. If the difference between the two sets of metrics is significant (e.g., satisfies a tuning condition), the weights of the estimation function are adjusted (modified) to cause the estimation function to generate an accurate prediction of the content related metrics for audience B. Alternatively, if the difference between the two sets of metrics is insignificant (e.g., does not satisfy a tuning condition), then no adjustment to the weights of the estimation function is performed.

Accordingly, aspects of the present disclosure provide content providers with a mechanism to simplify the audience selection process by identifying possible new audiences for their content and presenting, for each identified new audience, a predicted increase in the number of content related user actions that would occur if the respective new audience is also designated to receive the content of the content provider. This prevents a content provider from guessing which additional audiences should also receive content of the content provider in order to increase the number of desired user actions related to the content of the content provider. By preventing the content provider from guessing which additional audiences should receive the content, processing resources are no longer wasted on presenting the content to users of the content sharing platform that are not interested in that content, the users' trust and/or interest in the content sharing platform is improved, and the content is now provided to an appropriate group of users. Further, by optimizing an estimation function offline, improved accuracy is achieved in predicting an increase in the number of user actions related to the content of the content provider, without the need to consume processing resources and network bandwidth for estimation function optimization during the live operation of the content sharing platform.

FIG. 1 illustrates an example system architecture 100, in accordance with implementations of the present disclosure. The system architecture 100 (also referred to as "system" herein) includes end user devices 102A-N, a data store 110, a content sharing platform 120, one or more server machines 130-140, content provider devices 152A-N, and a third party platform 165, each connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The end user devices 102A-N and content provider devices 152A-N may each include computing devices such as personal computers (PCs), laptops, mobile phones, smart phones, tablet computers, netbook computers, network-connected televisions, etc. In some implementations, end user devices 102A-N may also be referred to as "user devices" or "client devices." Each end user device may include a content viewer. In some implementations, a content viewer may be an application that provides a user interface (UI) for users to view or upload content, such as images, video items, web pages, documents, etc. For example, the content viewer may be a web browser that can access, retrieve, present, and/or navigate content (e.g., web pages such as Hyper Text Markup Language (HTML) pages, digital media items, etc.) served by a web server. The content viewer may render, display, and/or present the content to a user. The content viewer may also include an embedded media player (e.g., a Flash® player or an HTML5 player) that is embedded in a web page (e.g., a web page that may provide information about a product sold by an online merchant). In another example, the content viewer may be a standalone application (e.g., a mobile application or app) that allows users to view digital media items (e.g., digital video items, digital images, electronic books, etc.). According to aspects of the disclosure, the content viewer may be a content sharing platform application for users to record, edit, and/or upload content for sharing on content sharing platform 120. As such, the content viewers may be provided to the end user devices 102A-N by content sharing platform 120. For example, the content viewers may be embedded media players that are embedded in web pages provided by the content sharing platform 120.

A media item 121 may be consumed via the Internet or via a mobile device application, such as a content viewer of end user device 102A-N. As discussed previously, a requested media item 121 may be requested for presentation to the user by the user of the content sharing platform 120. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 110. In another implementation, the content sharing platform 120 may store media items 121 or fingerprints as electronic files in one or more formats using data store 110. The media items 121 may be provided to the user, wherein the provision of the media item 121 may comprise one or more of: allowing access to the media item 121, transmitting the media item 121 and/or presenting or permitting presentation of the media item 121.

In one implementation, the media items 121 are video items. A video item is a set of sequential video frames (e.g., image frames) representing a scene in motion. For example, a series of sequential video frames may be captured continuously or later reconstructed to produce animation. Video items may be provided in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some implementations, data store 110 is a persistent storage that is capable of storing media items 121 as well as data structures to tag, organize, and index the media items 121. Data store 110 may be hosted by one or more storage devices, such as main memory, magnetic or optical storage based disks, tapes or hard drives, NAS, SAN, and so forth. In some implementations, data store 110 may be a network-attached file server, while in other embodiments data store 110 may be some other type of persistent storage such as an object-oriented database, a relational database, and so forth, that may be hosted by content sharing platform 120 or one or more different machines coupled to the server content sharing platform 120 via network 104.

In one implementation, content sharing platform 120 or server machines 130-140 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items 121 and/or provide the media items 121 to the user. For example, content sharing platform 120 may allow a user to consume, upload, search for, approve of ("like"), disapprove of ("dislike"), or comment on media items 121. Content sharing platform 120 may also include a website (e.g., a webpage) or application back-end software that may be used to provide a user with access to the media items 121.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

Content sharing platform 120 may include multiple channels (e.g., channels A through Z). A channel can include one or more media items 121 available from a common source or media items 121 having a common topic, theme, or substance. Media items 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Third party platform(s) 165 can be used to provide video advertisements. Alternatively, third party platform(s) 165 can provide other services. For example, third party platform (s) 165 may be a video streaming service provider that produces a media streaming service via a communication application for users to play videos, TV shows, video clips, audio, audio clips, and movies, on end user devices 102A-N via the third party platform(s) 165.

In some implementations, a content provider may upload or otherwise provide (e.g., via third party platform 165) a media item 121 to content sharing platform 120 for presentation to one or more users. The content provider may identify an audience to be provided with media item 121. An audience may be defined by specifying a category of interests shared by a group of users. A category may correspond to one or more statuses (e.g., in market for a car, interested in green living, interested in romance movies, interested in baseball, a property ownership status, etc.) or attributes (e.g., an occupation, an industry associated with the occupation, a size of a company that employs the user, etc.) of a user of content sharing platform 120. A user may belong to a respective category if the user is associated with a status or an attribute corresponding to the category. A user may belong to multiple categories if the user is associated with each of the statuses or each of the attributes corresponding to each of the categories. For example, the content provider may indicate media item 121 should be provided to users that are in market for a car. As such, users having a status of being in market for a car may be provided with media item 121. In another example, the content provider may indicate media item 121 should be provided to attorneys. As such, users having an attribute of being an attorney may be provided with media item 121. In another example, the content provider may indicate media item 121 should be provided to users that are either in market for a car or attorneys. As such, users having a status of being in market for a car or an attribute of being an attorney may be provided with media item 121.

A user may be determined to be associated with a status or an attribute corresponding to a respective category based on one or more weights associated with the user, where the one or more weights each indicate a probability of the user belonging to the respective category. A user of a content sharing platform 120 may create a user profile and specify certain information in the user profile (e.g., name, email address, occupation, etc.). Content sharing platform 120 may also include, in the user profile, one or more weights each indicating a probability of the user belonging to a respective category. User profiles may further include historical data associated with a respective user. In some implementations, historical data may include data provided by the user (e.g., data provided when a user creates a user profile for content sharing platform 120, data provided by a user in response to questions prompted by content sharing platform 120, etc.). In other or similar implementations, historical data may include data collected as a result of the user interacting with content sharing platform 120. The historical data of the respective user may be used to determine the one or more weights associated with the user.

After the content provider has indicated audience(s) to which media item 121 should be presented, content related metrics may be collected as end users are shown and interact with the content. The content related metrics may be stored at data store 110. The content related metrics may include, for example, information about when media item 121 (the content) was shown to an end user, the amount of time the end user watched media item 121, to which audience(s) the end user belongs, whether the end user performed any actions related to the content, what actions the end user performed, etc.

Server machine 140 may include a new audience identifying sub-system 142. The new audience identifying sub-system 142 may contain a user content-related action estimator 146 and a new audience GUI creator 144. In some implementations, the user content-related action estimator 146 may predict how many additional user actions related to the content of the content provider would occur if a new audience were added to the audiences already designated to receive the content of the content provider. The user content-related action estimator 146 may use the content related metrics gathered from the audiences already designated to receive content to make the prediction about the effect of adding new audiences, as will be further discussed with reference to an example Venn diagram shown in FIG. 4.

Figure 4:
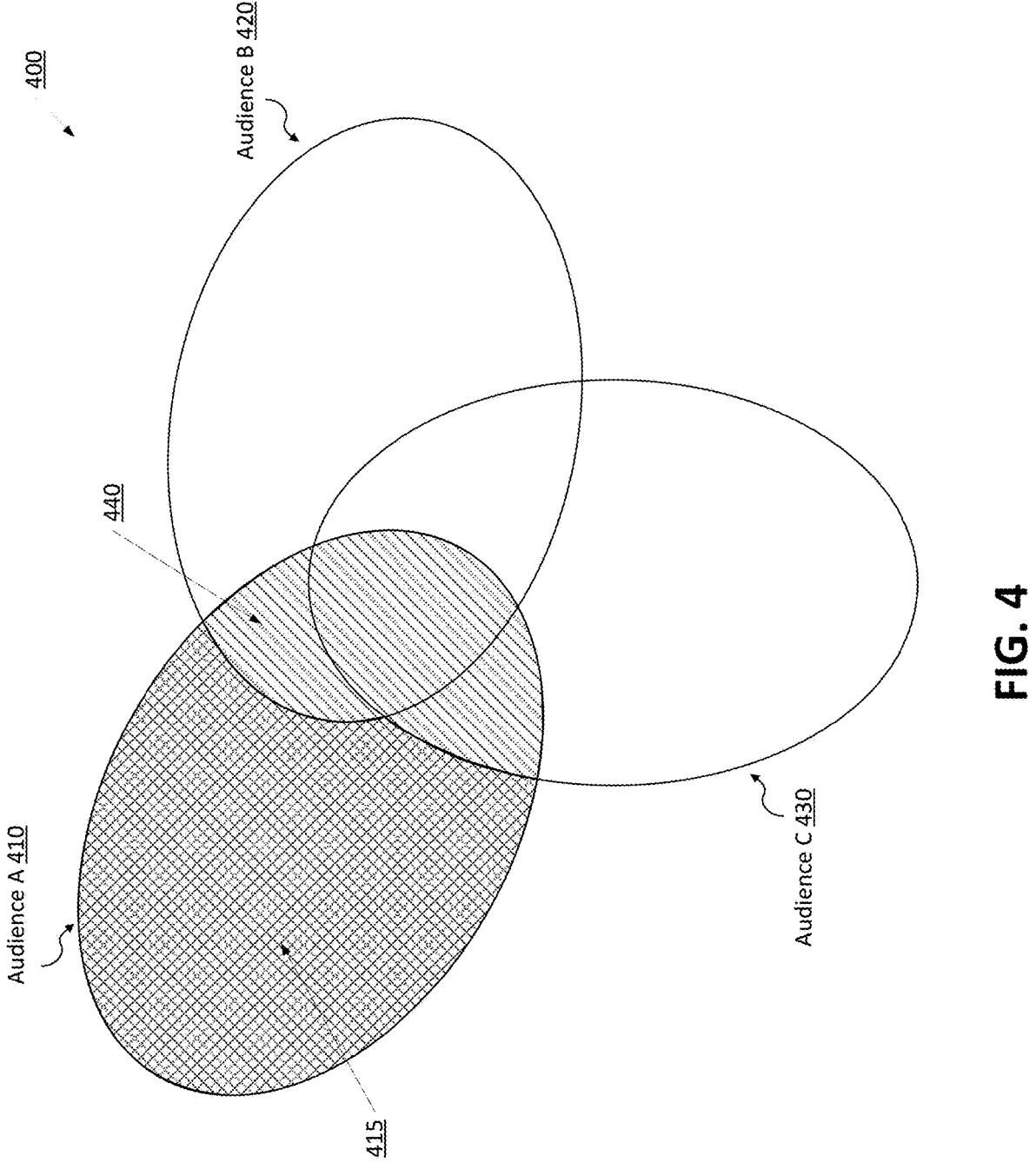
FIG. 4 illustrates an example Venn diagram showing how end users may belong to one or more audiences, in accordance with some aspects of the present disclosure.

Referring to FIG. 4, a content provider may initially designate two audiences (e.g. Audience B 420 and Audience C 430) to receive content. As the content is shown to end users in Audience B 420 or Audience C 430, content related metrics may be collected. The metrics may include how many end users in Audience B 420 have been shown the content (e.g., a number of impressions) and how many end users in Audience B 420 performed actions related to the content (e.g., a number of conversions). The metrics may also include how many end users in Audience C 430 have been shown the content (e.g., a number of impressions) and how many end users in Audience C 430 performed actions related to the content (e.g., a number of conversions). An impression rate for Audience B 420 may be calculated based on the number of end users in Audience B 420 that have been shown the content (the number of impressions) compared to the total number of end users in Audience B 420. A conversion rate for Audience B 420 may be calculated based on the number of end users in Audience B 420 that performed actions related to the content (the number of conversions) compared to the number of impressions of Audience B 420. For example, if Audience B 420 contains 1,000 end users and 430 end users were shown the content, the impression rate would be 43% (i.e., 430/1000). If 43 of the end users that were shown the content performed actions related to the content, the conversion rate would be 10% (i.e., 43/430). An impression rate and a conversion rate for Audience C 430 may be calculated in a like manner.

In one example, the user content-related action estimator 146 may predict an increased number of user actions related to the content of the content provider in response to Audience A 410 being added to Audience B 420 and Audience C 430 as being designated to receive the content. The user content-related action estimator 146 has content related metrics associated with the end users currently designated to receive the content (i.e., end users in Audience B 420 and end users in Audience C 430). Because an end user can belong to more than one audience (e.g., be associated with more than one category of interests), the user content-related action estimator 146 may also have content related metrics associated with some end users in Audience A 410. For example, the line-shaded region 440 shows end users that are in either Audience B 420 or Audience C 430 (or both) and in Audience A 410. The user content-related action estimator 146 may estimate content related metrics for the end users in the hash-shaded region 415, the hash-shaded region 415 depicting end users that are not currently designated to receive the content (i.e., end users that are not in Audience B 420 and are not in Audience C 430).

The user content related action estimator 146 may operate based on the assumption that the impression rate of the end users in the hash-shaded region 415, the impression rate of the end users in the line-shaded region 440, the impression rate of the end users in Audience B 420, and the impression rate of the end users in Audience C 430 are all the same. Based on this assumption, the user content-related action estimator 146 may estimate a number of impressions of the end users in Audience A 410 by multiplying the impression rate of the end users in the line-shaded region 440 by the total number of end users that belong to Audience A 410.

In another example, the user content related action estimator 146 may estimate a number of impressions of the end users in Audience A 410 by calculating an average impression rate of the end users in the line-shaded region 440 using the impression rate of the end users in Audience B 420 and the impression rate of the end users in Audience C 430, and multiplying that average impression rate by the total number of end users in Audience A 410.

The user content related action estimator 146 may also operate based on the assumption that the conversion rate of the end users in the hash-shaded region 415 is the same as the conversion rate of the end users in the line-shaded region 440. In some implementations, the user content related action estimator 146 may calculate the conversion rate of the end users in the line-shaded region 440 as an average of the conversion rate of the end users in Audience B 420 and the conversion rate of the end users in Audience C 430, Using these assumptions, the user content related action estimator 146 may estimate the increased number of end user actions related to the content (e.g., the increased number of conversions) that would occur in response to Audience A 410 being added to Audience B 420 and Audience C 430 as being designated to receive the content of the content provider. The increased number of end user actions related to the content by end users in Audience A 410 (e.g., the estimated number of conversions of Audience A 410) may be equal to the conversion rate of the line-shaded region 440 multiplied by the estimated number of impressions of the end users in Audience A 410 as calculated above. In some implementations, since the actions performed by the users in the line-shaded region 440 were already accounted for when calculating conversion rates for the users in the Audience B 420 and Audience C 430, the increased number of end user actions related to the content by end users in Audience A 410 (e.g., the estimated number of conversions of Audience A 410) may be equal to the conversion rate of the line-shaded region 440 multiplied by the estimated number of impressions of the end users in the hash-shaded region 415, as calculated above.

In some implementations, the user content related action estimator 146 may operate based on the assumption that the content related metrics of the end users in the hash-shaded region 415 are substantially different from the content related metrics of the end users in the line-shaded region 440. In such implementations, a trained machine learning model may be used to provide the content related metrics of the end users in the hash-shaded region 415 based on the content related metrics of the end users in Audience B 420 and the content related metrics of the end users in Audience C 430 and the characteristics of the end users in Audience B 420, the characteristics of the end users in Audience C 430, and the characteristics of the end users in Audience A 410. The machine learning model can be trained on historical content related metrics and characteristics collected for existing audiences that were previously designated to receive the content of the content provider and have received this content in the past.

In some implementations, the user content related action estimator 146 uses weights to calculate the estimated content related metrics for the end users in Audience A 410. Initially, the weights may be assigned using default values and then tuned to improve the results. For example, the user content related action estimator 146 may compare an additional set of characteristics associated with the end users in the hash-shaded region 415 to an additional set of characteristics associated with the end users in the line-shaded region 440. Based on how similar or different the additional sets of characteristics are between the two groups of end users, the user content related action estimator 146 may add a number of weights to the formulas used to calculate the estimated content related metrics for the end users in Audience A 410. For example, if the difference between the additional sets of characteristics is greater than some threshold (e.g., satisfies a tuning condition), the estimated number of impressions of the end users in Audience A 410 may be equal to a weight value multiplied by the impression rate of the end users in the line-shaded region 440 further multiplied by the total number of end users that belong to Audience A 410. A weight value may also be added to the formula used to calculate the estimated number of conversion of the end users in Audience A 410 based on the conversion rate of the end users in the line-shaded region 440. The weight value used in the formula that estimates the number of impressions of the end users in Audience A 410 may be different from the weight value used in the formula that estimates the number of conversions of the end users in Audience A 410.

In some implementations, the weight values used by the user content related action estimator 146 in the estimation formulas may be tuned using the estimation function optimizer 132 of server machine 130. In some implementations, the estimation function optimizer 132 may be part of the same server machine 140 that estimates user related content actions. The estimation function optimizer 132 may tune the weight values used by the user content related action estimator 146 using historical content related metrics collected for existing audiences that were previously designated to receive the content of the content provider and have received this content in the past. For example, the content related action estimator 146 may use historical content related metrics from audience D and audience E. Audience D may be selected as the base audience and its content related metrics can be applied to the estimation function to predict content related metrics for audience E. The predicted content related metrics of audience E are then compared with the collected content related metrics of audience E to assess how accurate the estimation function is able to predict content related metrics of an audience. If the difference between the two sets of metrics is significant (e.g., satisfies a tuning condition), the weights of the estimation function are adjusted (modified) to cause the estimation function to generate an accurate prediction of the content related metrics for audience E. Alternatively, if the difference between the two sets of metrics is insignificant (e.g., does not satisfy a tuning condition), then no adjustment to the weights of the estimation function is performed. The estimation function optimizer 132 may run offline (e.g., as a backend process that is performed independently and not in response to interactions or requests of content providers), such that it is not necessary to spend resources on the live operation of the content sharing platform.

In some implementations, the user content related action estimator 146 may calculate an estimated increase in a number of user actions related to the content of the content provider for a large number of audiences that are not currently designated to receive the content of the content provider, regardless of whether these audiences have any overlap with the existing audiences that have been or are currently being targeted with respect to the content of the content provider. Alternatively, the user content related action estimator 146 may only calculate an estimated increase in a number of user actions related to the content of the content provider for each audience that is not currently designated to receive the content of the content provider for which some content related metrics have already been collected as a result of specific end users belonging to multiple audiences.

After calculating the estimated increases associated with new audiences, the user content related action estimator 146 may select a subset of the new audiences to recommend to the content provider. For example, the user content related action estimator 146 may select the audience that has the highest predicted conversion rate. In another example, the user content related action estimator 146 may select the audience that is predicted to generate the most conversions. The user content related action estimator 146 may select all audiences whose predicted increase in conversions exceeds a threshold. In some implementations, the threshold may be selected by the content provider.

Once a subset of audiences to recommend to the content provider is selected, information associated with each of the new audiences in the subset can be used by the new audience GUI creator 144 to create a graphical user interface (GUI) to be presented to the content provider. The created GUI may include representations of an identifier of the new audience, the estimated increase in the number of end user actions related to the content that would result if the new audience were added to the audiences designated to receive the content of the content provider, and an option to add a corresponding audience to the audiences that currently designated to receive the content of the content provider. The content provider devices 152A-N can present GUIs 154 provided by the new audience GUI creator 144. Example GUIs 154 will be discussed in greater detail below with reference to FIGS. 2 and 3.

Further to the descriptions above, a user (an end user or a content provider) may be provided with controls allowing the user to make an election as to both if and when systems, programs, or features described herein may enable collection of user information (e.g., information about a user's social network, social actions, content related actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
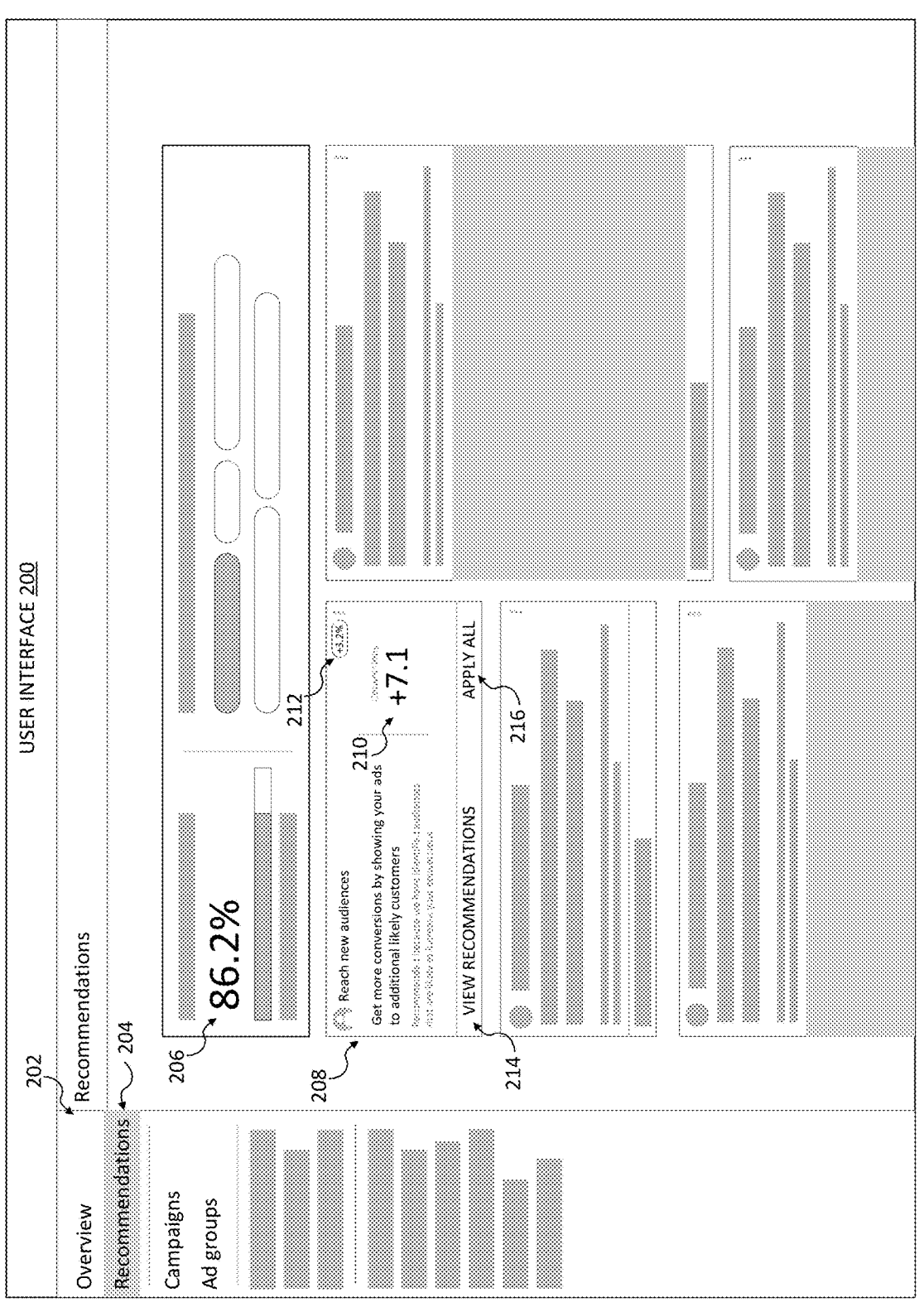
FIG. 2 illustrates an example user interface presenting a recommendation summary to a content provider to add new audiences to be designated to receive content of the content provider, in accordance with some aspects of the present disclosure.

FIG. 2 illustrates an example user interface presenting a recommendation summary to a content provider to add new audiences to be designated to receive content of the content provider, in accordance with some aspects of the present disclosure. User interface 200 may include at least a side menu 202, a recommendations option UI element (e.g., a button) 204, an overall optimization score indicator 206, and a new audience recommendation card 208. The user interface 200 may also include other recommendation cards and other UI components.

Upon user selection of recommendations option button 204, user interface 200 can present to the content provider an interface with one or more recommendations. That interface may include an overall optimization score indicator 206 and a new audience recommendation card 208. The overall optimization score indicator 206 may indicate to the content provider how close their content presentation configurations are to being optimal. The overall optimization score indicator 206 may represent an optimization percentage out of 100%. The new audience recommendation card 208 may contain text describing the recommendation to the content provider. The new audience recommendation card 208 may include a representation of the total estimated increase in conversions 210 that are expected if all of the current new audience recommendations are accepted by the content provider. The new audience recommendation card 208 may include a representation of the increase of the overall optimization score 212 that would occur if all of the current new audience recommendations are accepted by the content provider. The new audience recommendation card 208 may include a view recommendations button 214. When selected, the view recommendations button 214 may trigger the presentation of example user interface 300 from FIG. 3. The new audience recommendation card 208 may include an apply all button 216. When selected, the apply all button 216 may trigger the new audience identifying sub-system 142 to add audiences corresponding to the new audiences associated with each of the new audience recommendations to the audiences designated to receive the content of the content provider.

Figure 3:
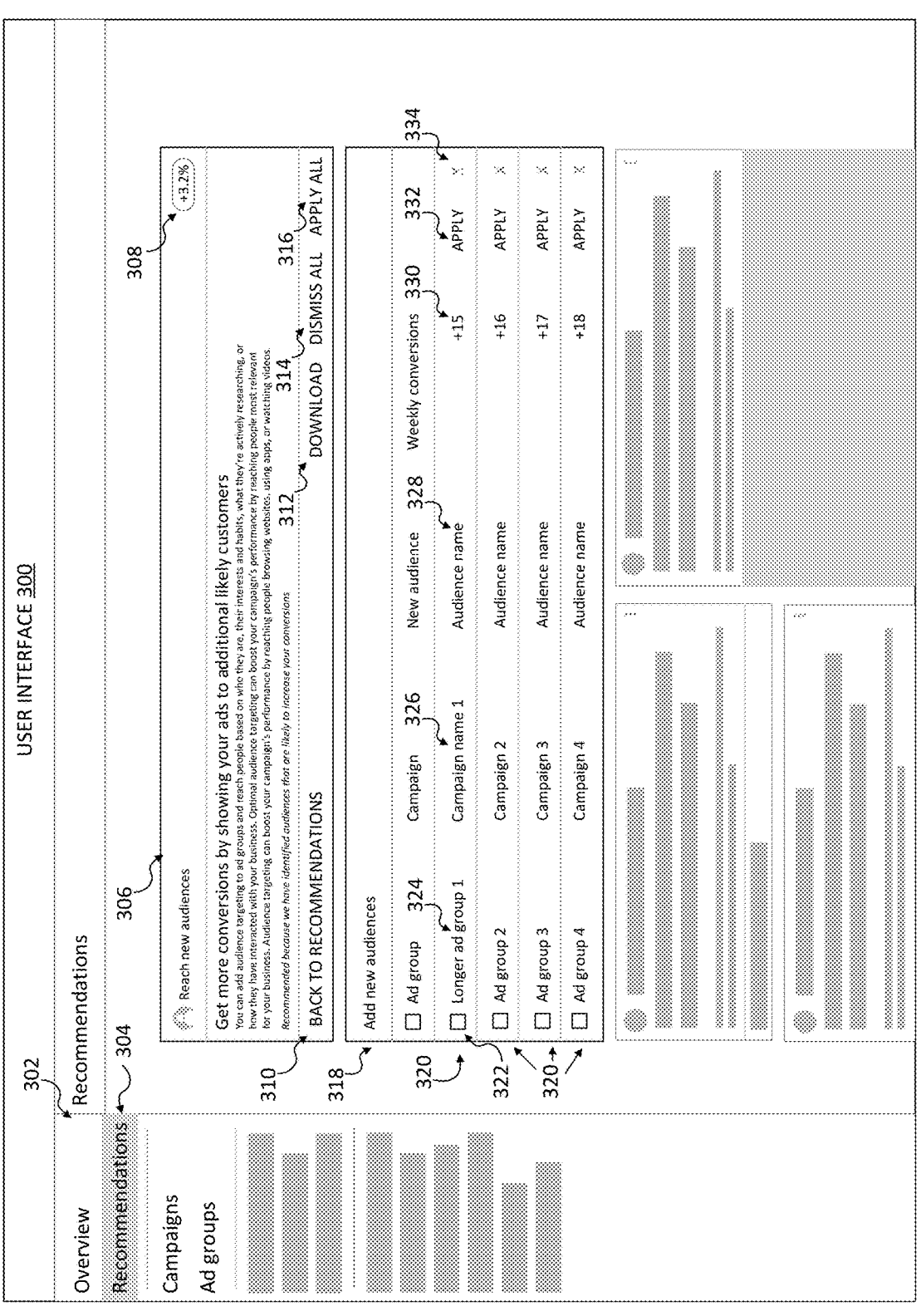
FIG. 3 illustrates an example user interface providing details pertaining to new audiences recommended to be added to existing audiences designated to receive content of the content provider, in accordance with some aspects of the present disclosure.

FIG. 3 illustrates an example user interface providing details pertaining to new audiences recommended to be added to existing audiences designated to receive content of the content provider, in accordance with some aspects of the present disclosure. User interface 300 may include at least a side menu 302, a recommendations option UI element (e.g., a button) 304, a reach new audiences summary card 306, and a new audience recommendations table 318. The user interface 300 may also include other recommendation cards and other UI components.

Upon user selection of view recommendations button 214, user interface 300 can present to the content provider an interface with one or more recommendations. That interface may include a reach new audiences summary card 306 and a new audience recommendations table 318. The reach new audiences summary card 306 may include a representation of the increase of the overall optimization score 212 that would occur if all of the current new audience recommendations are accepted by the content provider. The reach new audiences summary card 306 may include a back to recommendations button 310. When selected, the back to recommendations button 310 may trigger the presentation of example user interface 200. The reach new audiences summary card 306 may include a download button 312, a dismiss all button 314, and an apply all button 316. The download button 312, when selected, may trigger the new audience identifying sub-system 142 to generate a digital file to be downloaded by the content provider. The digital file may include information related to the new audience recommendations. For example, the digital file may include some or all of the information in the new audience recommendations table 318. The dismiss all button 314, when selected, may trigger the new audience identifying sub-system 142 to remove the current new audience recommendations from presentation to the content provider. The apply all button 316, when selected, may trigger the new audience identifying sub-system 142 to add audiences corresponding to the new audiences associated with each of the new audience recommendations to the audiences designated to receive the content of the content provider.

The user interface 300 may include a new audience recommendations table 318. The new audience recommendations table 318 may include one or more new audience recommendation rows 320. A new audience recommendation row 320 may include a recommendation checkbox 322, an ad group identifier 324, a campaign identifier 326, an audience identifier 328, an indication of an estimated increase in conversions 330, an apply recommendation button 332, and a dismiss recommendation button 334. The recommendation checkbox 322, when selected at one or more rows, may trigger the apply recommendation button 332 or the dismiss recommendation button 334 to appear at the respective rows. The apply recommendation button 332, when selected, may trigger the new audience identifying sub-system 142 to add an audience corresponding to the new audience associated with the new audience recommendation to the audiences designated to receive the content of the content provider. The dismiss recommendation button 334, when selected, may trigger the new audience identifying sub-system 142 to remove that new audience recommendation row 320 from presentation to the content provider.

FIG. 5 depicts a flow diagram of an example method 500 for providing a user interface to a content provider, the user interface containing new audience recommendations, in accordance with some aspects of the present disclosure. FIG. 6 depicts a flow diagram of an example method 600 for determining new audience to recommend to a content provider, in accordance with some aspects of the present disclosure. FIG. 7 depicts a flow diagram of an example method 700 for estimating a conversion rate for a group of users not currently designated to receive content of a content provider, in accordance with some aspects of the present disclosure. FIG. 8 illustrates a flow diagram for an example method 800 for optimizing the estimation function used to predict an increased number of user actions related to content of the content provider, in accordance with some aspects of the present disclosure. Methods 500, 600, 700, and 800 may be performed by processing logic that may include hardware (circuitry, dedicated logic, etc.), software (e.g., instructions run on a processing device), or a combination thereof. In one implementation, some or all the operations of methods 500, 600, 700, and 800 may be performed by one or more components of system 100 of FIG. 1.

Referring now to FIG. 5, at block 510, processing logic may provide, for display to a content provider, a user interface comprising an option to view new audiences to be added to a plurality of users currently designated to receive content of the content provider. The user interface may be similar to user interface 200, as described above.

At block 520, processing logic may receive a user selection of the option to view new audiences to be added to the plurality of users currently designated to receive the content of the content provider. The user selection may be an interaction by the content provider with the user interface 200. For example, the user selection may include the content provider clicking or selecting the view recommendations button 214, as described above.

At block 530, processing logic may cause display of information identifying the new audiences, the information identifying the new audiences comprises, for each new audience, an audience identifier, an indication of an estimated number of user actions related to the content of the content provider, and an option to request that a corresponding audience be added to the plurality of users currently designated to receive content of the content provider. The display of information may be similar to the user interface 300. For example, the audience identifier, the indication of an estimated number of user actions related to the content of the content provider, and the option to request that a corresponding audience be added to the plurality of users currently designated to receive content of the content provider may be, respectively, audience identifier 328, indication of an estimated increase in conversions 330, and apply recommendation button 332, as described above.

At block 540, processing logic may receive a user selection of the option to request that the corresponding audience be added to the plurality of users currently designated to receive content of the content provider. The user selection may be an interaction by the content provider with the user interface 300. For example, the user selection may include the content provider clicking or selecting the apply recommendation button 332, as described above.

At block 550, processing logic may add users from the corresponding audience to the plurality of users currently designated to receive the content of the content provider.

As discussed above, FIG. 6 depicts a flow diagram of an example method 600 for determining new audience to recommend to a content provider, in accordance with some aspects of the present disclosure. At block 610, processing logic may collect content related metrics for a first group of users, the content related metrics comprising a number of presentations of content to the first group and a number of user actions related to the content by the first group. In an example, the first group of users may include the end users in Audience B 420 and Audience C 430.

At block 620, processing logic may identify, in the first group of users, a sub-group of users that belongs to a second group of users not currently designated to receive the content of the content provider. For example, the second group of users not currently designated to receive the content of the content provider may be Audience A 410, and the sub-group of users in the first group of users may include the end users in the line-shaded region 440.

At block 630, processing logic may determine content related metrics for the identified sub-group of users. The content related metrics may include, for example, a number of impressions of the sub-group of users, a number of conversions of the sub-group of users, an impression rate of the sub-group of users, a conversion rate of the sub-group of users, etc. The content related metrics of the sub-group may be determined in accordance with previously described implementations.

At block 640, processing logic may estimate, based on the content related metrics of the identified sub-group of users, content related metrics for the second group of users. The content related metrics for the second group of users may include, for example, a number of impressions of the second group of users, a number of conversions of the second group of users, an impression rate of the second group of users, a conversion rate of the second group of users, etc. In some implementations, the content related metrics of the second group of users may be estimated in accordance with method 700.

At block 650, processing logic may predict, based on the estimated content related metrics of the second group of users, an increase in a number of user actions related to the content of the content provider in response to an addition of the second group of users to the first group of users. For example, the processing logic may predict an increase in the number of user actions related to the content of the content provider in response to adding Audience A 410 to Audience B 420 and Audience C 430 as currently designated to receive the content of the content provider, in accordance with previously described implementations.

At block 660, processing logic may, responsive to the estimated increase satisfying a threshold condition, provide information identifying the second group of users and the estimated increase for presentation to the content provider, as described above.

As discussed above, FIG. 7 depicts a flow diagram of an example method 700 for estimating a conversion rate for a group of users not currently designated to receive content of a content provider, in accordance with some aspects of the present disclosure. At block 710, processing logic may determine a number of presentations of the content of the content provider to the sub-group of users. At block 720, processing logic may determine a number of user actions related to the content of the content provider by the sub-group of users. At block 730, processing logic may determine a conversion rate for the second group of users based on the number of presentations of the content of the content provider to the sub-group of users and the number of user actions related to the content of the content provider by the sub-group of users. As described above, in some implementations, the processing logic may operate based on the assumption that the conversion rate for the second group of users is the same as the conversion rate for the sub-group of users. Alternatively, the processing logic may operate based on the assumption that the conversion rate for the second group of users is substantially different than the conversion rate for the sub-group of users, in which case a trained machine learning model or a comparison of additional characteristics of the groups may be used to determine the conversion rate for the second group of users, as described above.

As discussed above, FIG. 8 illustrates a flow diagram for an example method 800 for optimizing the estimation function used to predict an increased number of user actions related to content of the content provider, in accordance with some aspects of the present disclosure. At block 810, processing logic may determine content related metrics of the first group of users and content related metrics of a third group of users. Both the first group of users and the third group of users may have been previously designated to receive content of the content provider in the past and may have previously received the content. The content related metrics for each group may include, for example, a number of presentations of the content of the content provider to the group, a number of user actions related to the content of the content provider by the group, an impression rate for the group, a conversion rate for the group, etc.

At block 820, processing logic may, using the determined content related metrics of the first group of users and an estimation function, estimate content related metrics of the third group of users. The estimation function may be the same function used to estimate content related metrics in block 640.

At block 830, processing logic may modify a plurality of weights of the estimation function based on a comparison of the estimated content related metrics of the third group of users and the determined content related metrics of the third group of users. As described above, the plurality of weights of the estimation function may be modified in order to decrease the difference between the estimated content related metrics of the third group of users and the determined content related metrics of the third group of users.

Figure 9:
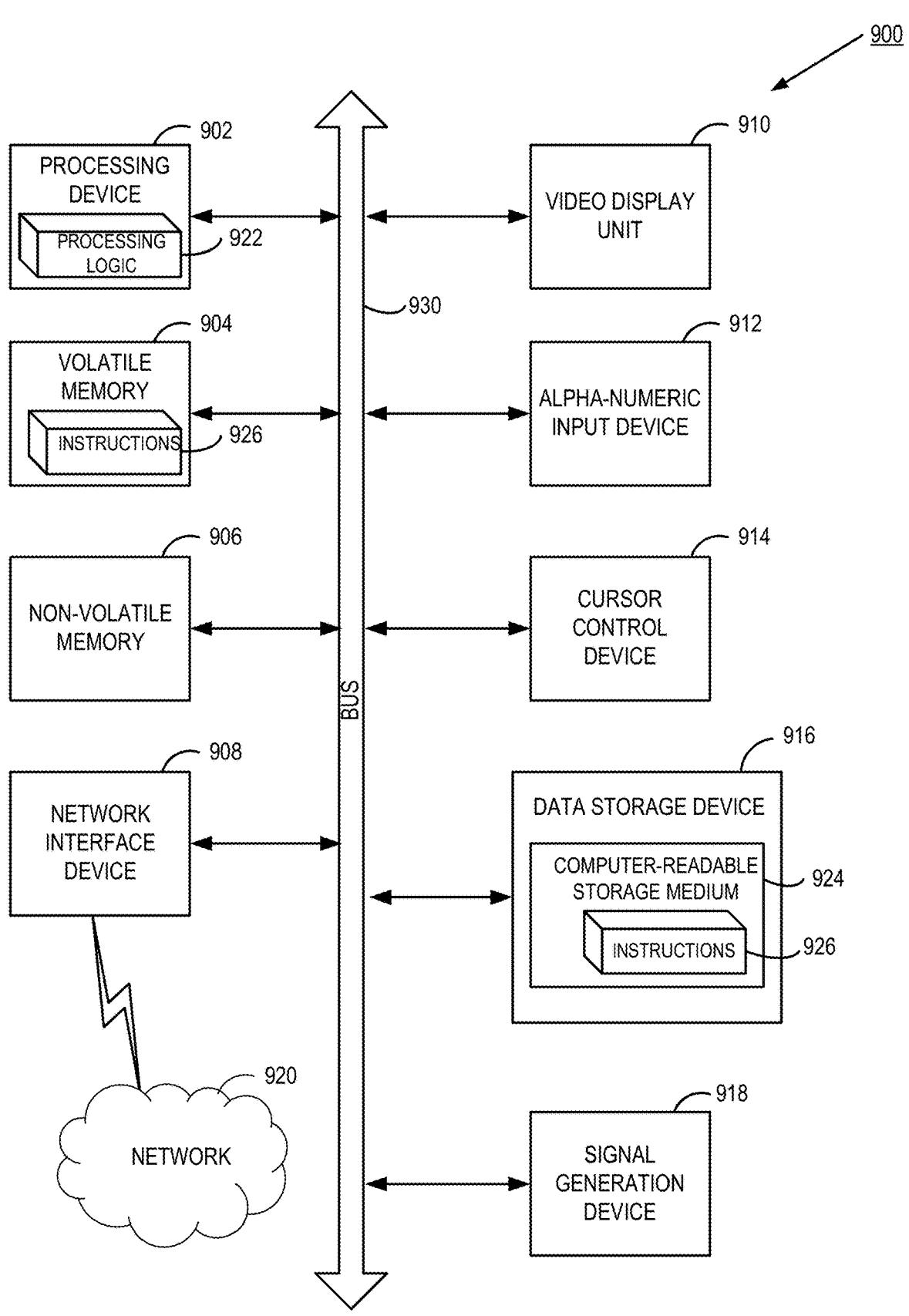
FIG. 9 is a block diagram illustrating an exemplary computer system, in accordance with implementations of the present disclosure.

FIG. 9 is a block diagram illustrating an exemplary computer system, in accordance with implementations of the present disclosure. The computer system 900 can be the server machine 130-140, end user devices 102A-N, or content provider devices 152A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device (processor) 902, a main memory 904 (e.g., read-only memory (ROM), flash memory, dynamic random access memory (DRAM) such as synchronous DRAM (SDRAM), double data rate SDRAM (DDR SDRAM), etc.), a static memory 906 (e.g., flash memory, static random access memory (SRAM), etc.), and a data storage device 916, which communicate with each other via a bus 630.

Processor (processing device) 902 represents one or more general-purpose processing devices such as a microprocessor, central processing unit (CPU), or the like. More particularly, the processor 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 can also be one or more special-purpose processing devices such as an application specific integrated circuit (ASIC), a field programmable gate array (FPGA), a digital signal processor (DSP), network processor, or the like. The processor 902 may include processing logic 922 for performing the operations discussed herein (e.g., to identify new audiences for content of a content provider and/or provide recommendations pertaining to the identified new audiences for presentation to the content provider).

The computer system 900 can further include a network interface device 908. The computer system 900 also can include a video display unit 910 (e.g., a liquid crystal display (LCD) or a cathode ray tube (CRT)), an input device 912 (e.g., a keyboard, and alphanumeric keyboard, a motion sensing input device, touch screen), a cursor control device 914 (e.g., a mouse), and a signal generation device 918 (e.g., a speaker).

The data storage device 916 can include a non-transitory machine-readable storage medium 924 (also computer-readable storage medium) on which is stored one or more sets of instructions 926 (e.g., to identify new audiences for content of a content provider and/or provide recommendations pertaining to the identified new audiences for presentation to the content provider) embodying any one or more of the methodologies or functions described herein. The instructions can also reside, completely or at least partially, within the main memory 904 and/or within the processor 902 during execution thereof by the computer system 900, the main memory 904 and the processor 902 also constituting machine-readable storage media. The instructions can further be transmitted or received over a network 920 via the network interface device 908.

In one implementation, the instructions 926 include instructions to identify new audiences for content of a content provider and/or provide recommendations pertaining to the identified new audiences for presentation to the content provider. While the computer-readable storage medium 924 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

providing, for display to a content provider, a user interface (UI) indicating one or more characteristics of existing audiences including a first group of users currently designated to receive content of the content provider, the UI comprising a new audiences UI element selectable to view new audiences to be added to the existing audiences;

receiving a user selection of the new audiences UI element; and in response to the user selection of the new audiences UI element, identifying, based on the first group of users, a second group of users not currently designated to receive the content of the content provider;

estimating content related metrics for the second group of users not currently designated to receive the content of the content provider;

predicting, using a machine learning model and based on the estimated content related metrics for the second group of users, an increase in a number of user actions related to the content of the content provider in response to an addition of the new audiences to the existing audiences, the new audiences comprising at least a sub-group of the second group;

responsive to the predicted increase satisfying a threshold condition, adding the second group of users to the new audiences; and causing display of information identifying the new audiences, and an indication of the predicted increased number of user actions related to the content of the content provider in response to the addition of the new audiences to the existing audiences.

2. The method of claim 1, wherein the information identifying the new audiences comprises, for each new audience, an audience identifier, an indication of an estimated number of user actions related to the content of the content provider, and an option to request that a corresponding audience be added to the first group of users currently designated to receive the content of the content provider.

3. The method of claim 1, wherein the content of the content provider comprises one or more secondary media items to be presented to the first group of users in association with a primary media item on the UI.

4. The method of claim 1, wherein predicting, using the machine learning model and based on the estimated content related metrics for the second group of users, the increase in the number of user actions related to the content of the content provider in response to the addition of the new audiences to the existing audiences further comprises:

collecting data identifying a number of presentations of the content of the content provider to the first group of users and a number of user actions related to the content of the content provider by the first group of users;

identifying, in the first group of users, a sub-group of users that also belongs to the second group of users not currently designated to receive the content of the content provider;

determining content related metrics for the identified sub-group of users; and estimating, based on the content related metrics for the identified sub-group of users, content related metrics for the second group of users, wherein the predicted increase in the number of user actions related to the content of the content provider is based on the estimated content related metrics for the second group of users.

5. The method of claim 4, wherein estimating the content related metrics for the second group of users further comprises:

determining a number of presentations of the content of the content provider to the identified sub-group of users;

determining a number of user actions related to the content of the content provider by the identified sub-group of users; and determining a conversion rate for the second group of users based on the number of presentations of the content of the content provider to the identified sub-group of users and the number of user actions related to the content of the content provider by the identified sub-group of users.

6. The method of claim 5, wherein determining the conversion rate for the second group of users further comprises:

comparing a set of characteristics associated with the identified sub-group of users with a set of characteristics associated with the second group of users, wherein the conversion rate for the second group of users is determined based on a comparison of the set of characteristics associated with the identified sub-group of users with the set of characteristics associated with the second group of users.

7. The method of claim 1, wherein the increase in the number of user actions related to the content of the content provider is predicted using an estimation function.

8. The method of claim 7, wherein the estimation function comprises one or more formulas that use a plurality of parameters and a plurality of corresponding weights, wherein the plurality of parameters comprises a number of users in the second group that are not currently designated to receive the content of the content provider, an estimated number of presentations of the content of the content provider to the second group of users, and an estimated number of user actions related to the content of the content provider by the second group of users.

9. The method of claim 8, further comprising:

determining content related metrics of the first group of users and content related metrics of a third group of users, wherein the first group of users and the third group of users were previously designated to receive the content of the content provider in the past;

using the determined content related metrics of the first group of users and the estimation function, obtaining estimated content related metrics of the third group of users; and modifying the plurality of weights of the estimation function based on a comparison of the estimated content related metrics of the third group of users and the determined content related metrics of the third group of users.

10. A system comprising:

a memory; and a processing device, coupled to the memory, to perform operations comprising:

providing, for display to a content provider, a user interface (UI) indicating one or more characteristics of existing audiences including a first group of users currently designated to receive content of the content provider, the UI comprising a new audiences UI element selectable to view new audiences to be added to the existing audiences;

receiving a user selection of the new audiences UI element; and in response to the user selection of the new audiences UI element, identifying, based on the first group of users, a second group of users not currently designated to receive the content of the content provider;

estimating content related metrics for the second group of users not currently designated to receive the content of the content provider;

predicting, using a machine learning model and based on the estimated content related metrics for the second group of users, an increase in a number of user actions related to the content of the content provider in response to an addition of the new audiences to the existing audiences, the new audiences comprising at least a sub-group of the second group;

responsive to the predicted increase satisfying a threshold condition, adding the second group of users to the new audiences; and causing display of information identifying the new audiences, and an indication of the predicted increased number of user actions related to the content of the content provider in response to the addition of the new audiences to the existing audiences.

11. The system of claim 10, wherein the information identifying the new audiences comprises, for each new audience, an audience identifier, an indication of an estimated number of user actions related to the content of the content provider, and an option to request that a corresponding audience be added to the first group of users currently designated to receive the content of the content provider.

12. The system of claim 10, wherein predicting, using the machine learning model and based on the estimated content related metrics for the second group of users, the increase in the number of user actions related to the content of the content provider in response to the addition of the new audiences to the existing audiences further comprises:

collecting data identifying a number of presentations of the content of the content provider to the first group of users and a number of user actions related to the content of the content provider by the first group of users;

identifying, in the first group of users, a sub-group of users that also belongs to the second group of users not currently designated to receive the content of the content provider;

determining content related metrics for the identified sub-group of users; and estimating, based on the content related metrics for the identified sub-group of users, content related metrics for the second group of users, wherein the predicted increase in the number of user actions related to the content of the content provider is based on the estimated content related metrics for the second group of users.

13. The system of claim 12, wherein estimating the content related metrics for the second group of users further comprises:

determining a number of presentations of the content of the content provider to the identified sub-group of users;

determining a number of user actions related to the content of the content provider by the identified sub-group of users; and determining a conversion rate for the second group of users based on the number of presentations of the content of the content provider to the identified sub-group of users and the number of user actions related to the content of the content provider by the identified sub-group of users.

14. The system of claim 13, wherein determining the conversion rate for the second group of users further comprises:

comparing a set of characteristics associated with the identified sub-group of users with a set of characteristics associated with the second group of users, wherein the conversion rate for the second group of users is determined based on a comparison of the set of characteristics associated with the identified sub-group of users with the set of characteristics associated with the second group of users.

15. A non-transitory computer-readable medium comprising instructions, which when executed by a processing device cause the processing device to perform operations comprising:

providing, for display to a content provider, a user interface (UI) indicating one or more characteristics of existing audiences including a first group of users currently designated to receive content of the content provider, the UI comprising a new audiences UI element selectable to view new audiences to be added to the existing audiences;

receiving a user selection of the new audiences UI element; and in response to the user selection of the new audiences UI element, identifying, based on the first group of users, a second group of users not currently designated to receive the content of the content provider;

estimating content related metrics for the second group of users not currently designated to receive the content of the content provider;

predicting, using a machine learning model and based on the estimated content related metrics for the second group of users, an increase in a number of user actions related to the content of the content provider in response to an addition of the new audiences to the existing audiences, the new audiences comprising at least a sub-group of the second group;

responsive to the predicted increase satisfying a threshold condition, adding the second group of users to the new audiences; and causing display of information identifying the new audiences, and an indication of the predicted increased number of user actions related to the content of the content provider in response to the addition of the new audiences to the existing audiences.

16. The non-transitory computer-readable medium of claim 15, wherein the information identifying the new audiences comprises, for each new audience, an audience identifier, an indication of an estimated number of user actions related to the content of the content provider, and an option to request that a corresponding audience be added to the first group of users currently designated to receive the content of the content provider.

17. The non-transitory computer-readable medium of claim 15, wherein the increase in the number of user actions related to the content of the content provider is predicted using an estimation function.

18. The non-transitory computer-readable medium of claim 17, wherein the estimation function comprises one or more formulas that use a plurality of parameters and a plurality of corresponding weights, wherein the plurality of parameters comprises a number of users in the second group that are not currently designated to receive the content of the content provider, an estimated number of presentations of the content of the content provider to the second group of users, and an estimated number of user actions related to the content of the content provider by the second group of users.

19. The non-transitory computer-readable medium of claim 18, the operations further comprising:

determining content related metrics of the first group of users and content related metrics of a third group of users, wherein the first group of users and the third group of users were previously designated to receive the content of the content provider in the past;

using the determined content related metrics of the first group of users and the estimation function, obtaining estimated content related metrics of the third group of users; and modifying the plurality of weights of the estimation function based on a comparison of the estimated content related metrics of the third group of users and the determined content related metrics of the third group of users.

* * * * *